Jan. 29, 1957 N. E. NILSSON ET AL 2,779,824

IDENTIFIER

Filed Aug. 27, 1953 6 Sheets-Sheet 1

INENTORS
NILS EMIL NILSSON
GUSTAV OSKAR RODNERT
PER GUSTAF JONSSON
BY [signature]
ATTORNEN INVENTORS
NILS EMIL NILSSON
GUSTAV OSKAR RODNERT
PER GUSTAF JONSSON
BY [signature]
ATTORNEY INVENTORS
NILS EMIL NILSSON
GUSTAV OSKAR RODNERT
PER GUSTAF JONSSON
BY Fredrick L. Haag
ATTORNEY

IDENTIFIER

Filed Aug. 27, 1953 6 Sheets-Sheet 4

INVENTORS
NILS EMIL NILSSON
GUSTAV OSKAR RODNERT
PER GUSTAF JONSSON
BY Fredrick L. Haug
ATTORNEY Jan. 29, 1957 N. E. NILSSON ET AL 2,779,824

IDENTIFIER

Filed Aug. 27, 1953 6 Sheets-Sheet 5

INVENTORS
NILS EMIL NILSSON
GUSTAV OSKAR RODNERT
PER GUSTAF JONSSON
BY Fredrick I. Hans
ATTORNEY INVENTORS
NILS EMIL NILSSON
GUSTAV OSKAR RODNERT
PER GUSTAF JONSSON
BY [signature]
ATTORNEY United States Patent Office 2,779,824
Patented Jan. 29, 1957

2,779,824

IDENTIFIER

Nils Emil Nilsson, Lilla Essingen, and Gustav Oskar Rodnert and Per Gustaf Jonsson, Hagersten, Sweden, assignors to Telefonaktiebolaget L M Ericsson, Stockholm, Sweden, a corporation of Sweden Application August 27, 1953, Serial No. 376,916

Claims priority, application Sweden August 29, 1952

5 Claims. (Cl. 179—18)

The present invention relates to automatic telephone exhanges with selectors, registers, and markers and provides a device for the identification of the elements, that is lines and selectors, registers and links, which take part in the connection. There are in every telephone system alarm devices, which indicate an uncompleted or faulty connection. The alarm devices indicate however generally only one coupling device in the connection, that is only that one, where the fault becomes apparent, for example the last coupled-in element in an uncompleted connection. Occasionally, the fault is however announced by a subscriber, and it is desired to know which element that is coupled in the subscriber's connection, is faulty. It is always very time-wasting to trace a connection in an automatic telephone exchange, and in a system with relay-selectors or crossbar-selectors there exist special difficulties, as an engaged and an unengaged selector show only small noticeable differences.

The present invention relates to a coupling, where all the elements taking part in the connection are indicated, each element thus becoming recognizable.

The aforementioned objects and other objects which will be pointed out hereinafter are attained in an automatic telephone system of the general kind above referred to, by providing lines, selectors, registers and a marker connected in circuit for setting up a connection over the selectors and lines, a signaling lead for signals between the lines and the selectors occurring in the connection, a marking conductor for each of the lines and the selectors, means for at least each selector connecting the marking conductor to the signaling lead when the selector is taking part in a connection within the telephone system. The system further comprises change-over contacts and test relays for testing and selecting arranged in the marker, multi-contact relays closing circuits over the marking conductors and the change-over contacts for the test relays, identifying relays, marking means connecting a particular marking to the signaling lead for a known line or selector taking part in the connection, means actuating the multi-contact relays and the change-over contacts to connect the marking conductors to the identifying relays, the particular marking acuating the signaling relays, and means operated by the signaling relays for designating a line or selector connected to the known line or the selector.

The aforementioned marking may either be a particular D.-C. voltage or an A.-C. voltage with a voice frequency or another marking known from identifier-arrangements, and may be coupled by means of a press-button, or over a jack arranged in the line belonging to the relay or the selector. The invention will now be described in detail with the aid of the accompanying drawings Figs. 1–7, which show the application of the invention in a cross-bar selector system, where the particular marking is made by connecting the plus-terminal of the battery of the exchange directly to the *c*-line of the connection. The connection is achieved in such a manner that to each line, register and link, from which a fault-marking can be signalized, has been assigned a number. During the identification the known line, register or link is called from an arbitrary subscriber's telephone by a number, consisting of a code-figure and the number of the line, register or link. The code-figure causes a change in the marker in such a manner, that the wire, which is normally used for testing on the *c*-line of the calling subscriber's number, is connected to the plus-terminal of the battery of the exchange.

Fig. 7 shows the manner in which Figs. 1–6 are to be arranged.

The present example shows only the traffic in a local exchange.

Figure 1:
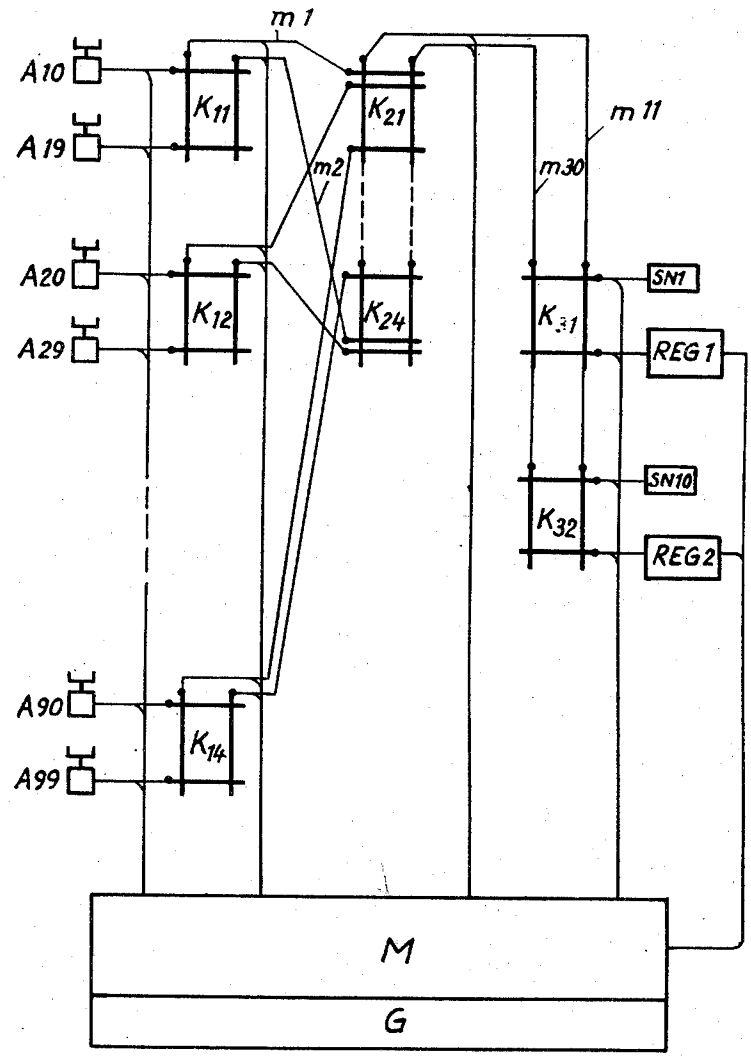
Fig. 1 shows the circuit connection in a telephone exchange, each subscriber's line having assigned a cross-bar selector bridge.

In Fig. 1 A10—A99 are subscriber's sets, each connected to its bridge in a primary cross-bar selector K11—K14. The links *m*1—*m*2 connect the primary cross-bar selectors K11—K14 with bridges in a secondary cross-bar selector K21—K24, which are connected between themselves and with the cross-bar selectors K31—K32 by means of the links *m*11—*m*30. The bridges in the cross-bar selectors K31—K32 are each connected to their link-circuit (trunk-line) SN1—SN10 or to a register REG1—REG2. The connections between the subscriber's sets A10—A49 are effected by a marker M. For identifying the links, subscriber's lines, registers and link-circuits (cord-lines), which take part in the connection, an identifier G is connected with the marker in accordance with the invention.

When the set A10 calls, it is for example connected over the links *m*1 and *m*11 with the register REG1. Then, the register being adjusted according to the subscriber's number of set A19, this register connects itself to the marker M and the subscriber's set A19 is for example over the links *m*2 and *m*30 connected with the link-circuit (trunk-line) SN1. Simultaneously the register REG1 indicates the link *m*11 in such a manner, that the links *m*11 and *m*30 are simultaneously connected with the link-circuit (trunk-line) SN1, and afterwards, the register disconnects itself from the connection. The connection, which has been set up, may thereafter be identified with the help of the identifier G. If the link-circuit (trunk-line) SN1 is known, the subscribers, which are connected to SN1 can be identified. If one of the subscribers A10 or A19 is known, the link-circuit (trunk-line) SN1, and the links *m*1, *m*2, *m*11 and *m*30 can be identified. If one register, e. g. REG1 is known, the identifier can point out which subscriber keeps the register engaged.

A connection is established in the following way. When the subscriber A10 calls, the line-relay R10 attracts its armature and the contacts 101—104 are operated. The following circuit is closed: +, contact 60 in Fig. 4, the contact 50 and others, the winding of the relay MR4, the wire *t*6, the contacts 218—219 and 216, rectifier F1, the lower winding of relay MR11, contacts 200, 194 and others, contacts 103 and 107, the winding of the bridge-magnet B10. The relays MR11—MR19 are group-relays for each 10 subscribers and constitute a chain, in which only one relay at a time can be attracted. The relays LR10—LR19 belong to the same 10-group and interrupt the current path for each other in such a manner, that only one bridge-magnet, for example B10, at a time can be marked. The relays MR11—MR19 have a high resistance in order that the bridge-magnet B10 cannot attract in series with the relay MR11. The bridge-magnet B10 will therefore not attract in the aforementioned circuit, but only the relays MR11 and MR4. The contacts 211—218 are operated. The contact 140 interrupts the coupling-circuit for the relays EK in such a manner, that the registers REG–2 cannot be coupled to the marker M. The contacts 212—213 couple the selection-relays MR20—MR29 to the 10 links *m*1—*m*2, which are connected to the subscriber's sets A10—A19. The relays MR20—MR29 constitute a chain, in which only one relay at a time can be attracted. It will be assumed here, that the relay MR20 attracts in the following circuit: +, contacts 229—221 and 223, the winding on relay MR20, rectifier F20, contacts 224, 212 and 117, the winding on bridge-magnet S19 to minus. The relay MR20 and bar-magnet S19 attract their respective armatures.

The contacts 220—223 and 190 are operated, thus selecting the link *m*1. Simultaneously relay MR10 in Fig. 3 attracts in the following circuit: +, contact 211, wire *t*4, contact 345, winding on relay MR10 to negative. The contacts 347—349 couple the registers REG1–2 to the selecting relays MR40—MR49, which constitute a chain, in which only one relay at a time can attract. It is assumed here that the relay MR40 attracts its armature in the following circuit: +, contacts 375—365 and 363, the windings on relay MR40, rectifier F49, contacts 353, 348 and 19, winding on relay E1 in Fig. 4, to negative. The lower windings of the relays MR40—MR49 have a high resistance, therefore only relay MR40, but not relay E1, attracts its armature. The contacts 361—366 are operated, thereafter the register REG1 is selected. The relay MR8 attracts in the following circuit: +, contact 220 in Fig. 2, wire *t*3, winding on relay MR8, contacts 314, 323 and 366 to negative. The contacts 315—316 are operated. Part of the secondary links *m*11—*m*30 are coupled to the selecting relays MR30—MR39, which constitute a relay chain, in which only one relay at a time can attract. It is here assumed, that the relay MR39 attracts its armature in the following circuit: +, contacts 343—326 and 341, winding on relay MR39, rectifier F30, contacts 321, 315 and 319, winding of the bar-magnets S29 and S30 to negative. The magnets S29 and S30 attract their armatures. The contacts 290 and 300 close, a secondary link *m*11 thus being selected.

If none of the links coupled in by relay MR8 are free, relay MR7 will attract in the following circuit: +, contact 220, wire *t*3, winding on relay MR7, contacts 316, 327—340, and 366. The contacts 311—314 are operated. Relay MR8 releases and the remaining links *m*11—*m*30 are coupled in.

Figure 4:
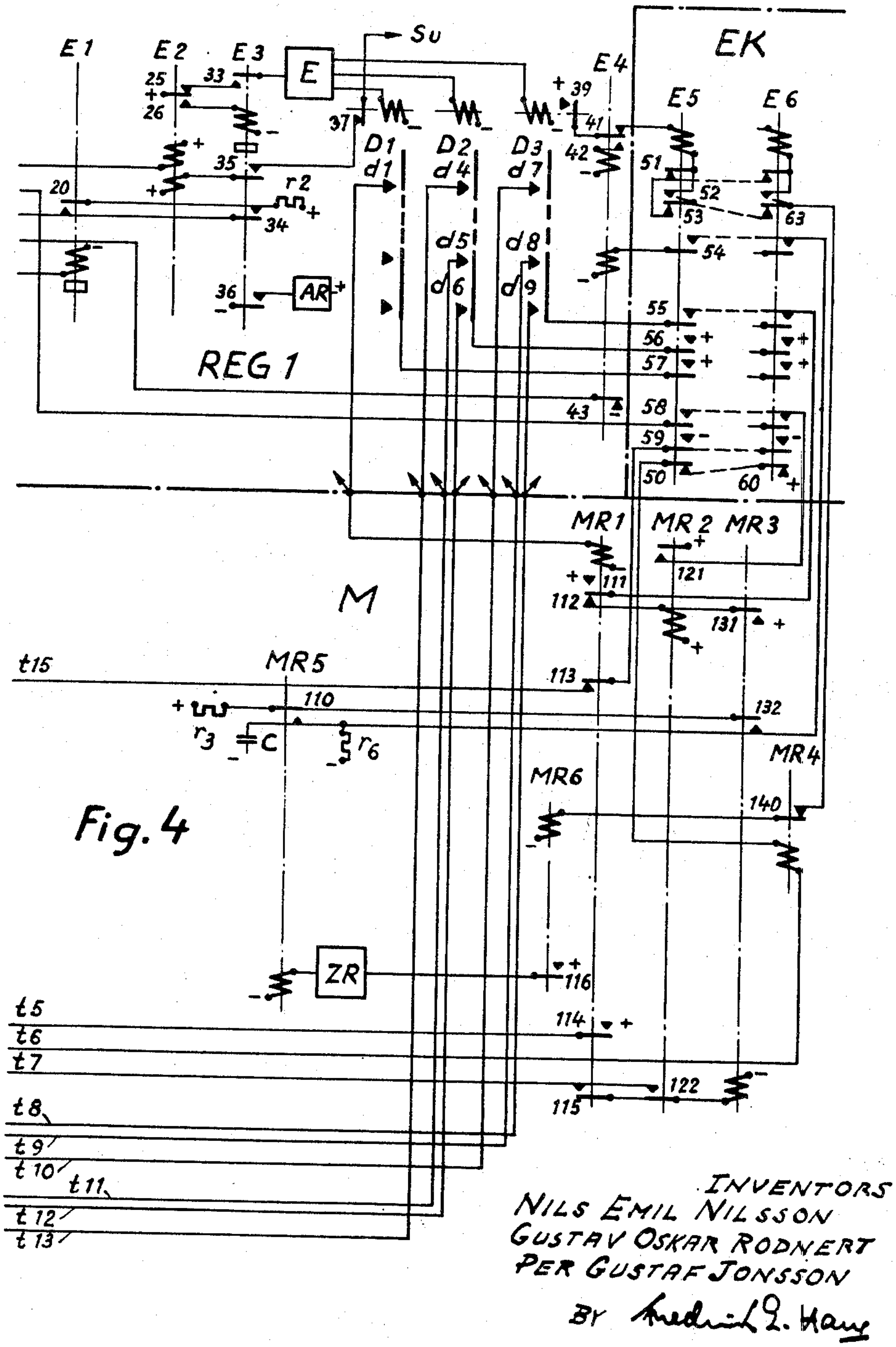
Fig. 4 shows a register REG and part of the marker M, such as the relay EK for coupling the register to the marker.

The contact 300 together with 371 and 362 short-circuits the lower winding on relay MR40, whereby relay E1 in Fig. 4 attracts its armature. Contact 20 closes the following circuit: +, resistor *r*2, contact 20 winding on the bridge-magnet B212, contact 43, to negative. The bridge-magnet B212 attracts its armature. The contacts 18—19 and *a*4, *b*4, *c*4 are operated. The relay E1 has delayed action and does not release its armature immediately. The bridge-magnets B10 and B11 attract their armatures in the following circuits: +, resistor *r*2 in Fig. 4, contacts 20, C4, 290, 214 and 200, contact 190, winding on the bridge-magnet B11, to negative, and respectively contacts 194, 103 and 107, winding on the bridge-magnet B11, to negative. The contacts 116—117, *a*2, *b*2, *c*2 and 105—108, *a*0, *b*0, *c*0 are operated. The relay HR11 attracts its armature. The contacts 110, 118 and 119 are operated. The bar-magnets S19, S29 and S30 release their armatures. The relays MR11, MR20, MR8, MR39, MR10, MR49 and E1 release their armatures. Meanwhile the following circuit has been established: +, the upper winding on relay E2 in Fig. 4, contacts A4, A2, *a*0, circuit-loop over the subscriber's set A10, contact 102, winding on line-relay LR10, to negative. Relay E2 attracts its armature. The contacts 25—26 are operated. Relay E3 attracts its armature. The contacts 33—36 are operated. Thereafter the bridge-magnets B10, B11 and B212, and relay HR11 are kept actuated over the contacts 34 and 110. A time-signal device AR is started. The subscriber at the set A10 will hear a buzzer-tone from a buzzer S*u*, which is connected over the contacts 35 and 37 to the lower winding of relay E2.

Now the subscriber at the set A10 dials the number of the subscriber's set A19 on his dial. The pulses are repeated by the pulse-relay E2 to a pulse-receiving device E, which adjusts the register mechanisms D1, D2 and D3. During the pulse-transmission, the relays LR10 in Fig. 2 and E3 in Fig. 4 are at rest, because they have delayed-release. The first figure is a code-figure, which indicates, whether the call refers to one of the subscriber's sets A10—A99, an identification or an outgoing traffic-direction. Outgoing traffic is here not included. With the call to the set A19, the registering of the first figure at the mechanism D1 causes only the contact 37 to discontinue the buzzer-tone. When the second figure is registered, at the mechanism D2, the contact *d*5 is closed, and when the third figure is registered at the mechanism D3, the contacts *d*9 and 39 are closed. If the marker M is unengaged, the relays E5 and MR6 attract in the following circuit: +, contacts 39 and 41, the winding on relay E5, contacts 51, 53—63, and 140, winding on relay MR6 to negative. The contacts 50—59 are operated. The relays E5—E6 constitute a relay-chain, in which only one relay at a time is attracted. The relay MR6 closes the contact 116 and starts a time-device ZR, which gives the marker M, by attraction of the relay MR5, free, if the connection is not accomplished. The following circuit is closed: +, contacts 56 and *d*5, wire *t*11, winding on relay TR1, to negative. Relay TR1 attracts its armature and the contacts 200—205 are operated. The following circuit is closed: +, winding on relay MR2 in Fig. 4, contacts 112, 55, and *d*9, wire *t*8, contacts 231 and 203, winding on bridge-magnet B19, to negative. Relay MR2 is a test-relay with high resistance and attracts only when the subscriber's set A19 is free. The magnet B19 cannot attract in series with relay MR2. It is assumed, that the relay MR2 attracts its armature. Contacts 121—122 close. The following circuit is closed: +, the upper winding on relay MR11 in Fig. 2, contact 202, wire *t*7, contact 122, winding on relay MR3, to negative. Relay MR11 has a high resistance and attracts its armature, but relay MR3 is not operated. In this manner, the selecting-relays MR20—MR29 are again coupled for the selection of a free link, for example *m*2, corresponding to the bar-magnet S10, and the described process is repeated with the difference, that the relay MR9 in Fig. 3 attracts its armature in the following circuit: +, contact 211, wire *t*4, winding on relay MR9, wire *t*15, contacts 113 and 59, to negative. The contacts 344—346 are operated. Relay MR10 is disconnected by contact 345. The selecting-relays MR40—MR49 are coupled to the link-circuits (cord-lines) SNR1—SNR2 instead of to the register, as described above. A free link-circuit (trunk), for example SNR1, is selected, as relay MR49 attracts its armature in the following circuit: +, contacts 375—365, 373, the winding of relay MR9, rectifier F40, contacts 361, 344 and 17 the upper winding on relay R2, to negative. The contacts 371—375 are operated, but relay R2 is not operated.

Simultaneously the bar-magnet S30 is attracted in the following circuit: +, contact 12 in Fig. 4, contacts 58 and *b*4, the upper winding on the bar-magnet S30 to negative.

The relays MR7 and MR8 are operated as aforedescribed and couple the selecting-relays MR40—MR49 to the links *m*11—*m*30. It is assumed here, that the link *m*30 is selected and the bar-magnets S39 and S20 attract their armatures. The contacts 309 and 372 short-circuit the upper winding on relay MR49, which has a high resistance. Relay R2 attracts its armature. The contacts 21—24 are operated. The bridge-magnet B211 receives current over the contact 23 and attracts its armature. The contacts 16—17, *a*3, *b*3, *c*3 and *a*5, *b*5, *c*5 are operated.

The relay R2 has delayed release, as its lower winding is connected in parallel with a large condenser.

The connection with the subscriber's set A19 is accomplished in the same manner as has been described above for the link *m*11. When contact C5 closes, the following circuit is established: +, resistor *r*1, in Fig. 3, contacts 23, C5 and 210 (compare to C3 and 290 for the link *m*11), contacts 214 and 201, wire *t*7, contact 122, winding on relay MR4, to negative. Relay MR4 attracts its armature and operates the contacts 131—132. Contact 131 short-circuits the winding on relay MR2, which causes the bridge-magnet B19 in Fig. 2 to attract its armature in the aforedescribed circuit over wire *t*8. The contacts 195—198, *a*10, *b*10 and *c*10 are operated. The bridge-magnet for the link *m*2 (corresponding to B11 for link *m*1) receives current over the contact O9 and attracts its armature. The contacts for link *m*2, corresponding to the contacts 116—117, *a*6, *b*6, *c*6, are operated, and the relay for the link *m*30, corresponding to relay HR11, attracts its armature.

Simultaneously relay E4 in Fig. 4 attracts in the following circuit: +, resistor *r*3, contacts 132 and 54, the lower winding on relay E4, to negative. Thus, the lower winding on relay E4 is connected in parallel with a large condenser, which is charged by a current through the resistor *r*3, thus making relay E4 delayed-attracting. The resistor *r*6 is a discharge resistor. The contacts 41—43 are operated. The contact 41 interrupts the current for the coupling-relay E5, which releases its armature and disengages the marker M. The contact 43 interrupts the current for the bridge-magnet B212, which releases its armature and disengages the register REG1.

Figure 3:
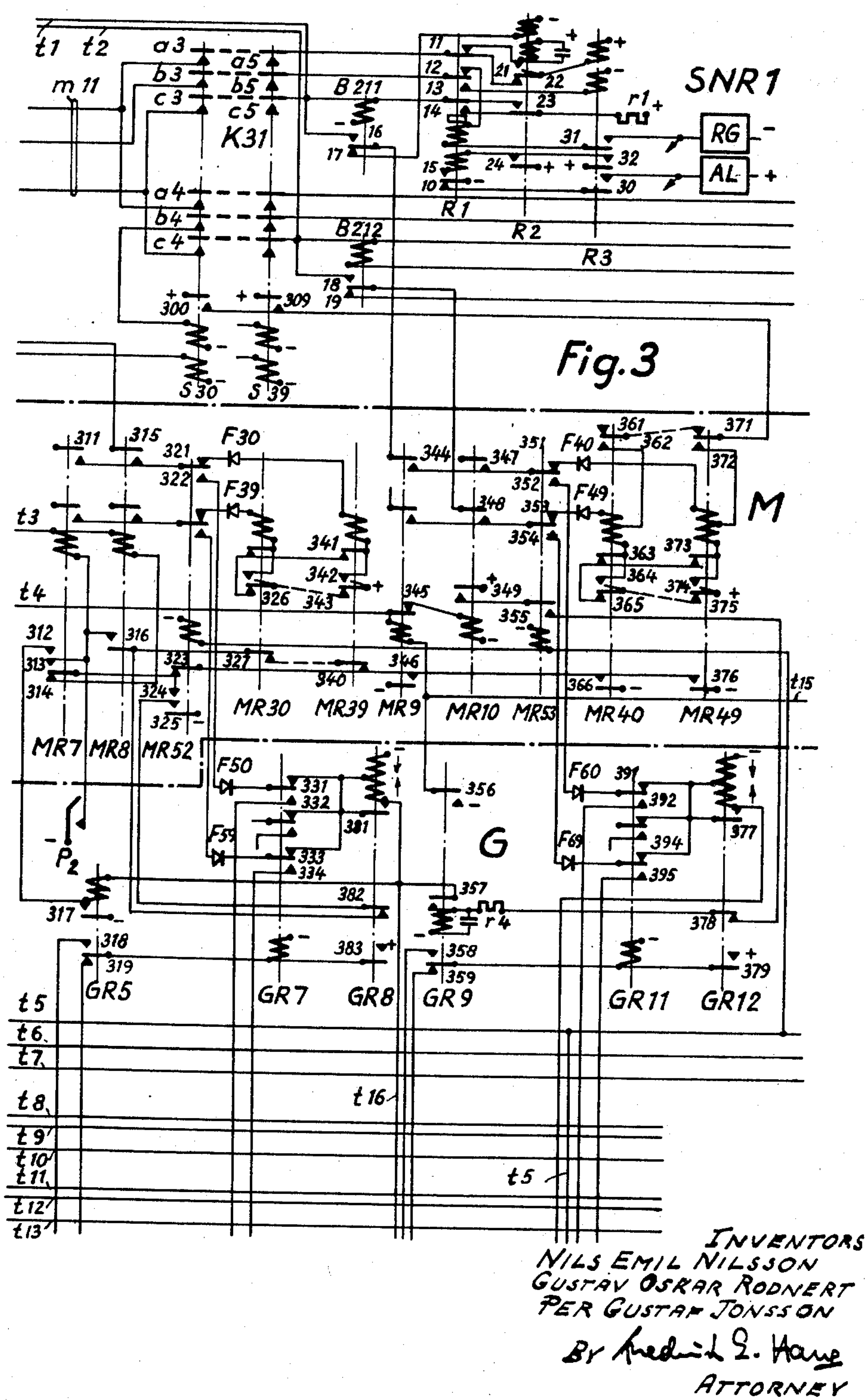
Fig. 3 shows the other part of the secondary link (*mll*), a trunk line (link circuit) SNR, a register connection (B212), part of the marker M, and part of the identifier G.

The connection is thereafter maintained by the subscriber at the set A10 through the following circuit: +, upper winding on relay R3 in Fig. 3, connected in parallel with the lower winding on relay R2 at contact 21, contacts 11, *a*3, *a*2, *a*0, the circuit-loop over the set A10, contact 102, winding on line-relay LR10, to negative. The relay R2 is held and relay R3 attracts. The contacts 30—32 are operated. The ring signal is transmitted to the set A19 over the following circuit: +, condenser, which is connected in parallel with the lower winding on relay R2, contacts 11, *a*5, the contact for the links *m*2 and *m*30, which corresponds to *a*6, *a*10, the circuit-loop over the set A19, contacts 191, *b*10, the contact for the links *m*2 and *m*30, which corresponds to *b*6, *b*5, 12, upper winding on relay R1, contact 31, a ring-generator RG, to negative. Relay R1 has delayed action and is not influenced by the ring-current. When the subscriber at the set A19 answers, relay R1 attracts. The contacts 10—15 are operated. The current for the relays R2, R3 and LR10 is interrupted by the contact 11. Relay LR10 releases its armature while relays R2 and R3 retain their armatures during the discharge-time of the condenser, which is connected in parallel with the lower winding on relay R2. Relay R1 is kept by the current over the contacts 15 and 24. When relay R2 releases its armature, relay R3 is partly held by a circuit over the set A10, partly by a circuit over the set A19. The circuit over the set A10 is the following: +, the upper winding on relay R3, contacts 22, *a*3, *a*0, circuit-loop over the set A10, contacts 101, *b*0, *b*2, *b*3, 13, the lower winding on relay R3, to negative. The connection will exist, until both subscribers replace their handsets.

Figure 2:
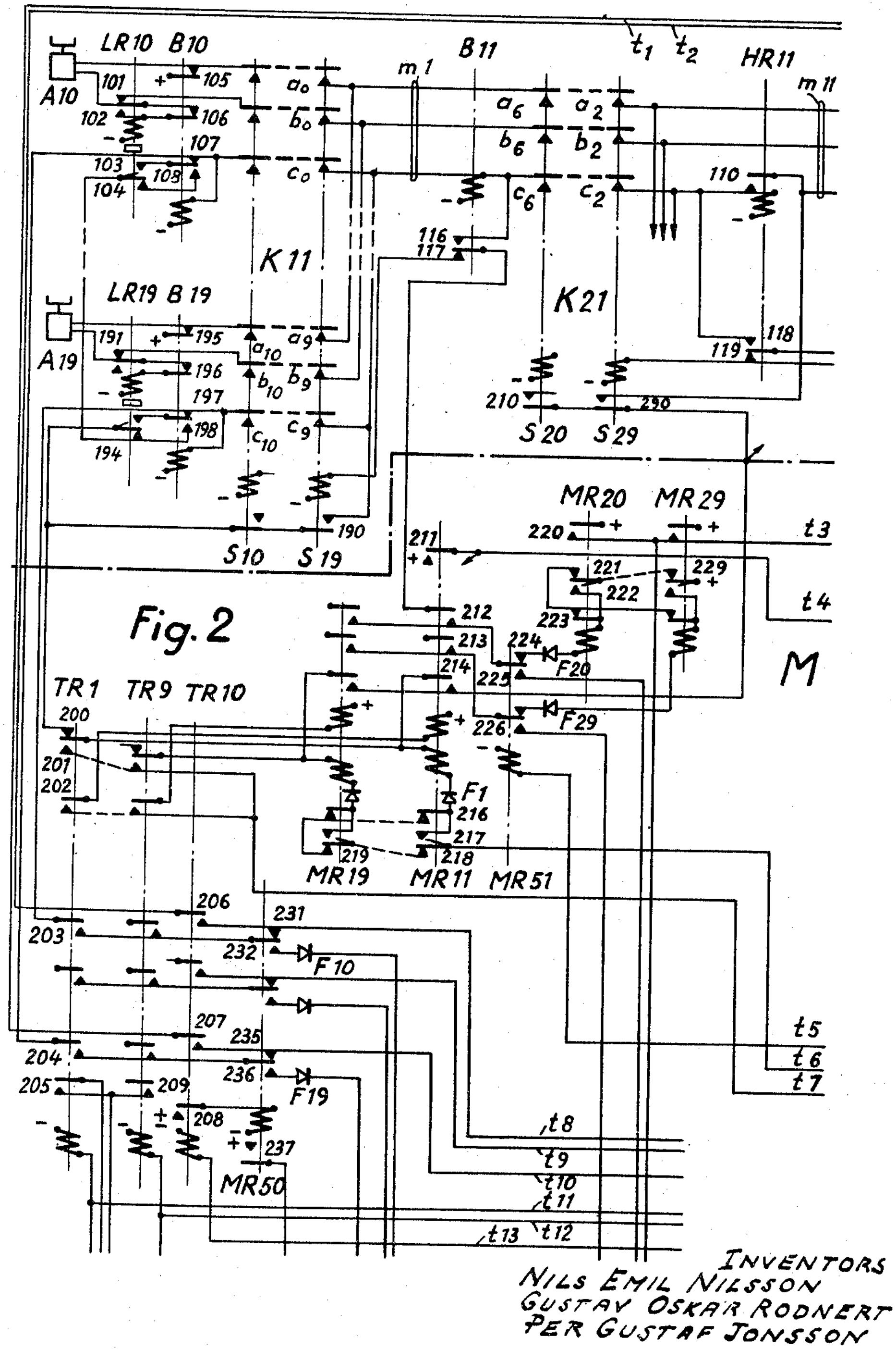
Fig. 2 shows two subscriber's lines with their line equipment, a primary link (*ml*) and part of a secondary link (*mll*), a and a part of the marker M.

Fig. 4 shows an alarm-device AR for the register REG1. This will operate when the register is kept busy for too long a time at a call, for example as the result of a call from a faulty line, for example the line for the set A10. For identifying the faulty line a call is initiated from any subscriber's set, for example A19. The set A19 is connected to a free register, for example REG2, and the number of the register is dialled. Thus, the contacts in the register REG2 are closed, which correspond to *d*1, *d*4, *d*9 and 39. The relays E6 and MR6 attract their armatures and the following circuit is established: +, contacts 57 and *d*1, winding on relay MR1, to negative. Relay MR1 operates the contacts 111—115. Relay MR6 closes the contact 116 and the time-device ZR starts in order to disengage after a certain time the marker M by operating the relay MR5, which closes the contact 110. The relay TR10 in Fig. 2 is energized over the wire *t*13 and the contacts *d*4 and 56. The contacts 206—208 are operated. The following connection is established: +, the contacts 111 in Fig. 4, 55 and *d*9, wire *t*8, contact 206, wire *t*2, contacts *c*4, 110, *c*2, *c*0, to contact 204, which is not yet closed. Relay MR50 is energized over contact 208 and operates the contacts 231—237. Simultaneously, relays MR51 in Fig. 2, MR52 and MR53 in Fig. 3, and GR13 in Fig. 6 attract while plus is connected to wire *t*5 over the contact 114 in Fig. 4. The contacts 224—226, 321—325, 351—355 and 621—628 are operated. Relay GR13 is then kept with current over contact 621 and the press-button P1. Relay GR14 in Fig. 5 is energized over contact 628 and operates contacts 521—529.

Figure 5:
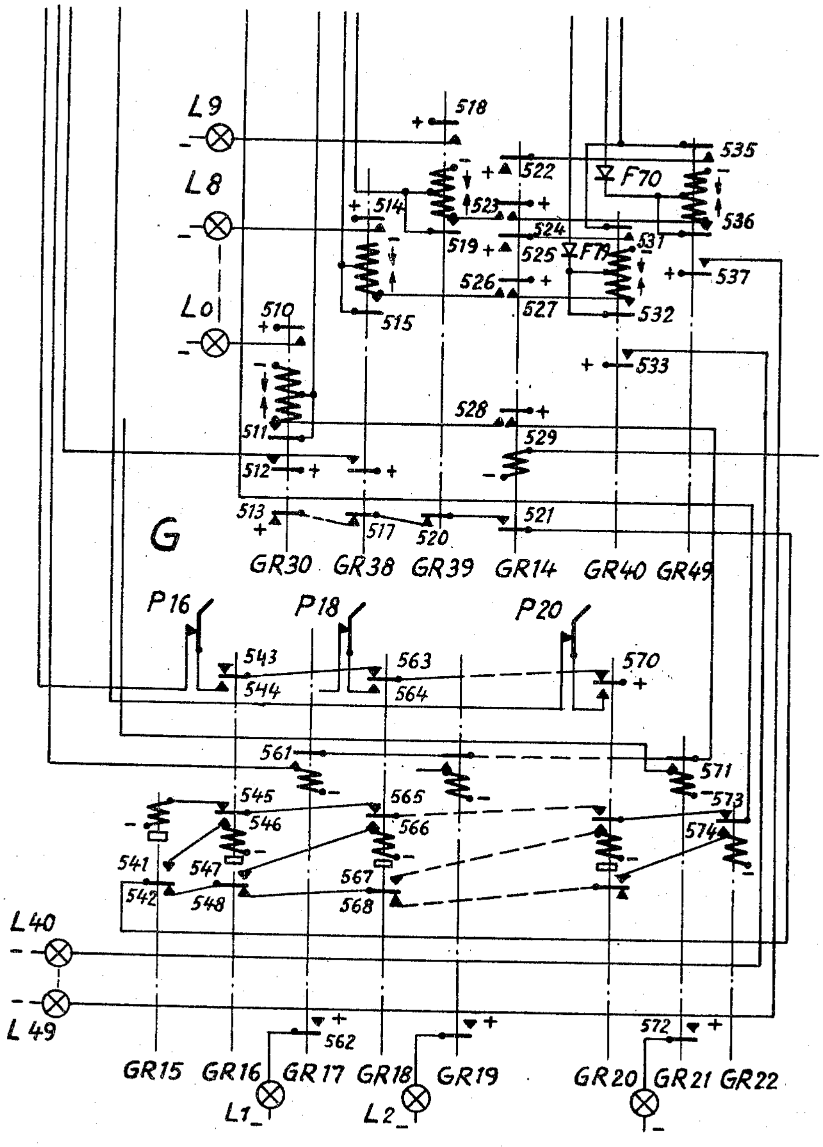
Fig. 5 and Fig. 6 show each a part of the identifier G.
Figure 6:
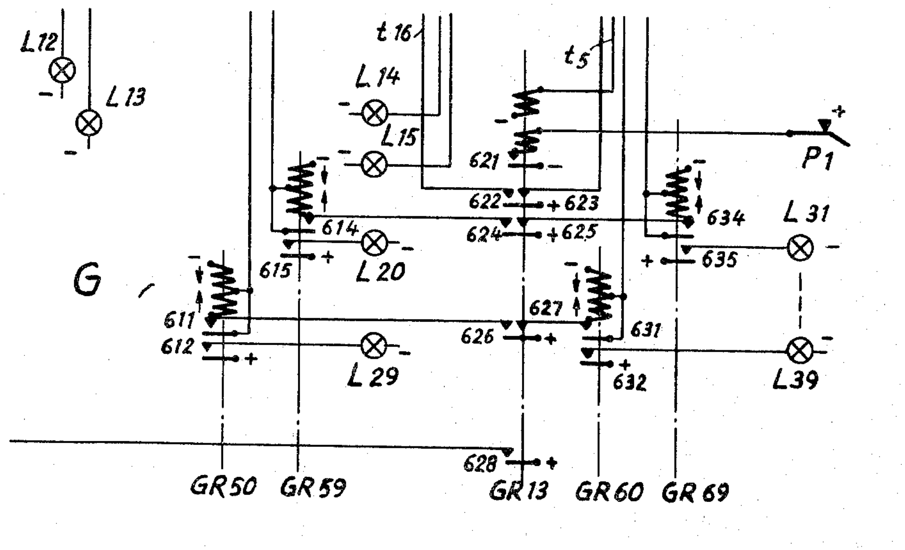
Figure 7:
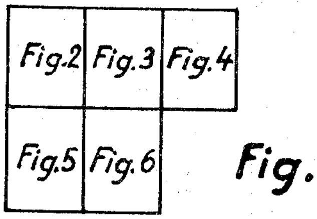

The contact 237 in Fig. 2 starts a selector-device, consisting of the relays GR15—GR22 in Fig. 5, over the following circuit: +, contacts 237, 573—565, 545, the winding on relay GR15, to negative. Relay GR15, which is somewhat slow-releasing, operates the contacts 541—542. The relays GR16, GR18—GR20 have delayed release. The relay GR16 operates the contacts 543—548. The following circuit is established: +, contacts 570—563, 544, the press-button P16, winding on relay TR1, to negative. The contacts 200—205 are operated. Thereby, all the marking-wires for all the subscriber's sets in the 10-group A10—A19 are coupled to the test-relays GR30—GR39 in Fig. 5. These test-relays have each two windings, which counteract each other, in order that they be not magnetized, when the contacts 523, 526 and 528, respectively, close. Relay GR39, for example, is coupled over the rectifier F10 and the contact 203 to the marking-wire for the set A19, from which the identification is assumed to be carried out and which is therefore busy. This marking-wire is connected to negative over a number of bridge-magnets B19 and others, and to plus over a resistor, corresponding to resistor *r*2 in Fig. 4. The potential of this marking-wire is however negative with reference to the potential on the other side of the rectifier F10, thus, no change of current occurring in the winding of relay GR39. Relay GR39 is therefore not operated. The marking-wire for set A10 is however connected to plus as described above and current passes over the contacts 204 and 236, through rectifier F19, and the upper winding on relay GR30, to negative. Relay GR30 operates the contacts 510—513. The following circuit is closed: +, contacts 512 and 205, the winding on relay GR17, to negative. Relay GR17 operates the contacts 561—562 and is thereafter held by current over the contact 529. Contact 545 has interrupted the current for relay GR15, which releases its armature. Relay GR16 is retained by current over the contact 546. The lamps L1 and L0 light and indicate the subscriber's line A10.

If none of the relays GR30—GR39 had attracted, the relay GR18 would have attracted in the circuit over the contacts 513—517, 520—521, 542 and 547, and the marking wires for the next 10-group would have been coupled in.

The identification is, however, thereafter not yet completed, as the links *m1* and *m11*, which connect the subscriber's set A10 with the register REG1 must also be indicated. The following circuit is therefore closed in Fig. 2: +, the upper winding on relay MR11, contact 202, wire *t7*, contact 115, the winding on relay MR3, to negative. Relay MR11 attracts its armature, but not relay MR3. The contacts 221—218 are operated. The links *m1*—*m2* are connected over the contacts 212—213 and 225—226 and the rectifiers F70—F79 to the test relays GR40—GR49 in Fig. 5, which work according to the same principle as the relays GR30—GR39. Because the link *m1* is marked with plus, a circuit is closed over the contacts 116, 212 and 225 and rectifier F70 through the upper winding of relay GR49, which attracts and operates the contacts 535—537. The lamp L49 lights and indicates the link *m1*.

The contact 211 causes current to flow through the relay MR10, which couples the registers REG1—REG2 over the contacts 347—348, 352 and 354 and the rectifiers F60—F69 and the contacts 391 and 394 to a group-relay GR12, which works according to the same principles as the relays GR30—GR49. The group-relay GR12 is energized through its upper winding from the register REG1 over wire *t2*, the contacts 18, 348 and 354, rectifier F69 and contact 394. Relay GR12 operates the contacts 377—379. The relay GR11 attracts its armature, the contacts 391—395 are operated. The marking wires from the register are now coupled over the contacts 392 and 395 to the test relays GR60—GR69 in Fig. 6. The test relays GR60—GR69 work according to the same principle, as the test relays in Fig. 5. The relay GR69 attracts its armature in a circuit from wire *t2*, the contacts 18, 348, 354, rectifier F69, contact 395 through the upper winding of GR69, to negative. The contacts 634—635 are closed. The lamp L31 lights and indicates together with the lamp L15 the register REG1. The lamp L15 is lit by current over the contacts 379 and 359.

When one of the relays GR40—GR49 in Fig. 5 attracts its armature, plus is connected to the wire *t3* in Fig. 2, for example over the contacts 522 and 535. Relay MR8 attracts its armature in the following circuit: plus, contact 522 in Fig. 5, contact 535, wire *t3*, the winding on relay MR8, contacts 314, 324—325, to negative. The contacts 315—316 are operated. The marking wires for the first group of links *m11*—*m30* are coupled over the contacts 315 and others, 322 and others, the rectifiers F50—F59 and the contacts 331—333 to a group relay GR8. Because the link *m11* belongs to this first group, relay GR8 attracts immediately. If a link has been marked, which does not belong to the first group, relay GR8 is not yet operated. Instead, the relay MR7 can attract its armature in the following circuit: +, contact 522 in Fig. 5, 535, wire *t3*, winding on relay MR7, contacts 316, 382 and 325, to negative. The contacts 311—314 are operated. Relay MR8 is disconnected by the contact 314 and the second group of links is connected to the group relay GR8. The relay GR5 attracts in the following circuit: +, contact 622 in Fig. 6, wire *t16*, the winding on relay GR5, the contacts 312, 313, 324, and 325, to negative, and operate the contacts 317—319. The group lamp is lit by current over the contacts 383 and 318.

In the present case, however, only relay MR8 attracts and a circuit is closed over the contacts 110, 118, 315, 322, rectifier F50, and the contact 331 through the upper winding of the group relay GR8, which attracts its armature and operates the contacts 381—383. Relay GR7 is energized over contact 383 and operates the contacts 331—334, therewith connecting the links, which are coupled in by relay MR8, with the test relays GR50—GR59 in Fig. 6. The test relay GR50 attracts its armature. The contacts 611—612 are operated. The lamp L29 lights and indicates together with the group lamp L13 the link *m11*.

All the test relays, which have attracted, short-circuit their lower winding, therefore remaining attracted after the marker has been disengaged, which is caused by the time device ZR and the relay MR5 in Fig. 4, which closes contact 110. When the lamps in the identifiers have been read, the identifier is disengaged by pressing the button P1 for a moment. When the marker becomes disengaged, the relays MR51, MR52 and MR53 release and the marker can set up new call-connections, independent of whether the registration in the identifier remains or not.

The identification of subscribers, which are connected to a certain link-circuit (trunk-line), is effected in the same manner as the identification of a subscriber, which is connected to a certain register. The number of the known link-circuit (trunk-line), for example of SNR1, is dialled and plus is connected from the marker to the wire *t1* instead of to *t2*. In this case, the group relay GR12 in Fig. 3 does not attract, when relay MR10 couples in the register, but relay GR9 attracts in the following circuit: +, contacts 349, 355 and 378, resistor *r4*, winding on relay GR9 to negative. Relay GR9 is somewhat delayed in attracting, as a condensor is connected in parallel with the winding. The contacts 356—359 are operated. Relay MR9 receives current over the contact 356. The contacts 344—346 are operated. Relay MR10 is disconnected and the marking wires for the link-circuits (trunk-lines) are coupled instead of the marking wires for the register. The group lamp L14 is lit instead of L15 by current over the contacts 379 and 358.

If it is desired to know which circuit element is connected to a certain subscriber, the identification is carried out by dialling the subscriber's number with a certain code-figure first. Thereby, the contact *d1* in the register, Fig. 4, is closed, relay MR1 attracts, and plus is connected from the contact 111 to the c-line of the subscriber's set, which is called, for example set A10. Relay MR11 attracts in series with relay MR3 with current over contact 115, wire *t7* and contact 202, but because the relays MR51—MR52 and MR53 are energized over the contact 114 and attract their armatures, the test relays in the identifier are coupled in instead of the selecting relays of the marker. The identification is carried out as described above.

Because two subscribers can be coupled simultaneously to one link-circuit (cord-line), they have usually to be identified separately at the identification of subscribers from a known link-circuit (cord-line). After one of them has been identified, the button P16 in Fig. 5, or P18—P20, depending on the 10-group, to which the identified subscriber belongs, is pressed. When the lamps have been read, a new identification is carried out, this time the relay selectors GR16—GR20 bypassing the first identified 10-group. The relays GR18—GR20 couple in one after the other its 10-group until the second subscriber is reached, the relays GR19—GR21, corresponding to its 10-group, attracting its armature and lighting the corresponding lamp, for example L2.

Two links *m11*, *m30* may likewise be coupled to the same link-circuit (trunk-line) and belong to different groups. Because, as stated, only one link is obtained during the identification, the button P2 in Fig. 3 has to be pressed and the identification to be repeated. In doing so, relay MR7 will attract its armature and disconnect relay MR8, in order that the other link may be identified.

If no subscriber's set is coupled to the link-circuit (cord-line) or register, for which the identification is carried out, the relays GR16, GR18—GR20 will attract one after the other without lighting any lamp, whereafter relay GR22 attracts and operates the contacts 573—574 and interrupts the circuit.

We claim:

1. In an automatic telephone system in combination, lines, selectors, registers and a marker connected in circuit for setting up a connection over said selectors and lines, a signalling lead for signals between lines and selectors occurring in said connection, a marking conductor for each of said lines and selectors, means for at least each selector connecting said marking conductor to said signalling lead when the selector is taking part in a connection within the telephone system, change-over contacts and test-relays for testing and selecting arranged in the marker, multi-contact relays closing circuits over said marking conductors and said change-over contacts for said test relays, identifying relays, marking means connecting a particular marking to said signalling lead for a known line or selector taking part in said connection, and means actuating said multi-contact relays and said change-over contacts to connect said marking conductors to said identifying relays, said particular marking actuating said signalling relays and means operated by said signalling relays designating a line or selector connected to said known line or selector.

2. In an automatic telephone system including selectors, registers and at least one marker interconnected one with the others for completing circuits between lines connecting subscribers with said system, means for identifying the lines of a completed connection and the selectors utilized for attaining said connection comprising a marking conductor for each of said lines and selectors, a signalling circuit, means associated with each selector for connecting its marking conductor with said signalling circuit when a selector is operated in the completion of said connection, test relays including change-over contacts in said marker connected with said system for determining the particular selectors to be utilized in making said connection, multi-contact relays connected between said marking conductors and said test relays for closing circuits therebetween, identifying relays, means associated with said signalling circuit and interconnected with said multicontact relays, test relays and identifying relays for completing circuits from said marking conductors to said identifying relays signalling relays interconnected with and responsive to the operation of said identifying relays, and means responsive to said signalling relays to designate the lines and selectors of said completed connection.

3. In an automatic telephone system according to claim 2 wherein each selector, each trunk not provided with a separate selector and each subscriber's line are provided with means including an identifying number, and a test conductor is connected between said signalling circuit and said marker and wherein said marker includes means for connecting a marking conductor to said test-conductor for a line or selector the number of which is transmitted to said marker.

4. In an automatic telephone system as described in claim 2, wherein a contact actuated by one of said identifying relay closes a circuit of one of said multi-contact relays to connect the signalling circuit for said lines and selectors being identified to the identifying relays.

5. In an automatic telephone system according to claim 2, line relays each connecting ten of said test conductors to relays for unit-marking in the marker, changeover contacts changing the last mentioned test conductors from said relays for unit-marking to said identifying relays, means for operating said group relays one after the other to identify the group containing a marked test conductor

References Cited in the file of this patent

UNITED STATES PATENTS

| | | |
|---|---|---|
| 2,503,052 | Williford | May 16, 1950 |
| 2,586,704 | Ostline | Feb. 16, 1952 |
| 2,698,880 | Sheperd | Jan. 4, 1955 |